United States Patent [19]

Ohmae et al.

[11] Patent Number: 5,075,382
[45] Date of Patent: Dec. 24, 1991

[54] ADHESIVE FOR GLASS LAMINATE COMPRISING SILANE-MODIFIED ETHYLENE COPOLYMER

[75] Inventors: Tadayuki Ohmae; Kentaro Mashita, both of Chiba; Kazunori Furukawa, Kanagawa; Toshio Kawakita, Osaka, all of Japan

[73] Assignee: Sumitomo Chemical Co., Ltd., Osaka, Japan

[21] Appl. No.: 601,607

[22] Filed: Oct. 22, 1990

Related U.S. Application Data

[63] Continuation of Ser. No. 342,692, Apr. 24, 1989, abandoned, which is a continuation of Ser. No. 60,561, Jun. 11, 1987, abandoned.

[30] Foreign Application Priority Data

Jun. 11, 1986 [JP]  Japan ................. 61-135592

[51] Int. Cl.$^5$ ............... C08F 267/04; C08F 222/04; B32B 17/10
[52] U.S. Cl. ............................ 525/285; 525/288; 526/272; 428/429; 428/442
[58] Field of Search ............. 525/285, 288; 526/272; 428/429, 442

[56] References Cited

U.S. PATENT DOCUMENTS

| 3,663,649 | 5/1972 | Wheeler. | |
|---|---|---|---|
| 3,666,614 | 5/1972 | Snedeker et al. | 428/429 |
| 3,804,919 | 4/1974 | Schrage et al. | 428/429 |
| 4,617,366 | 10/1986 | Gloriod et al. | 526/272 |
| 4,680,319 | 7/1987 | Gimpel et al. | 525/288 |

FOREIGN PATENT DOCUMENTS

| 898893 | 5/1984 | Belgium. | |
|---|---|---|---|
| 3444094 | 6/1986 | Fed. Rep. of Germany | 526/272 |
| 2238588 | 2/1975 | France. | |
| 0063492 | 6/1978 | Japan | 525/285 |
| 0013804 | 1/1985 | Japan | 525/288 |
| 0147485 | 8/1985 | Japan | 525/288 |
| 1436930 | 5/1976 | United Kingdom. | |

OTHER PUBLICATIONS

Patent Abstracts of Japan, vol. 9, No. 309 (C-318), Published, Dec. 5, 1985.

Primary Examiner—Melvyn I. Marquis
Assistant Examiner—Vasu S. Jagannathan
Attorney, Agent, or Firm—Sughrue, Mion, Zinn, Macpeak & Seas

[57] ABSTRACT

A silane-modified ethylene copolymer is disclosed, which is prepared by graft copolymerizing from 0.1 to 10 parts by weight of a trialkoxyvinyl silane to 100 parts by weight of an ethylene/(meth)acrylic acid ester/maleic anhydride copolymer in the presence of a peroxide catalyst. Also, a process for producing a silane-modified ethylene copolymer and an adhesive comprising the copolymer are disclosed. The silane-modified ethylene copolymer of the invention is excellent in not only adhesion to metals, glass, polar high-molecular weight materials, or polyolefins but also maintenance of water-resistant adhesion to glass.

1 Claim, No Drawings

ADHESIVE FOR GLASS LAMINATE COMPRISING SILANE-MODIFIED ETHYLENE COPOLYMER

This is a continuation of application Ser. No. 07/342,692 filed Apr. 24, 1989, which is a continuation application of Ser. No. 07/060,561 filed June 11, 1987, both abandoned.

FIELD OF THE INVENTION

The present invention relates to a silane-modified ethylene copolymer, a process for producing the same, and an adhesive comprising the same. More particularly, the present invention relates to a silane-modified ethylene copolymer prepared by graft copolymerizing a trialkoxyvinyl silane to an ethylene/(meth)acrylic acid ester/maleic anhydride copolymer in the presence of a peroxide catalyst, as well as a process for producing the silane-modified ethylene copolymer and an adhesive comprising the same.

BACKGROUND OF THE INVENTION

Techniques have been known for graft modifying polyolefins represented by polyethylene or polypropylene with unsaturated carboxylic acids (e.g., acrylic acid) or anhydrides thereof (e.g., maleic anhydride) to introduce thereinto polar groups, to thereby impart adhesion between different kinds of substrates such as metals, glass, polar high-molecular weight materials, and polyolefins, as described, for example, in Japanese Patent Publication Nos. 18392/62 and 32654/77.

It has also been known to impart adhesion by copolymerizing α-olefins such as ethylene with polar monomers such as glycidyl (meth)acrylate, as described, for example, in Japanese Patent Publication No. 27527/71 and Japanese Patent Application (OPI) No. 11388/73 (the term "OPI" as used herein means "unexamined published application").

Though these graft modified polyolefins or copolymers exhibit fairly good initial adhesion to metals or glass, they have a drawback that their adhesion is appreciably deteriorated in a short period of time in an atmosphere where water is present. For example, with respect to the adhesion to glass, in packaging water-containing liquid foods such as sake, soy sauce, vinegar, mayonnaise, and jam, good maintenance of water-resistant adhesion between glass containers and their metallic lids is demanded, but the above-described graft modified polyolefins or copolymers cannot meet such a demand.

Furthermore, adhesives which are used in the area of food packaging are often required to have adhesion to metals, polar high-molecular weight materials, or polyolefins in addition to the above-described maintenance of water-resistant adhesion.

On the other hand, in order to improve a marked reduction in adhesion to glass in an atmosphere where water is present, it has been known to graft modify an ethylene-vinyl acetate copolymer with an unsaturated organosilane (see the Processings of the 23rd Annual Meeting of the Adhesion Society of Japan, pp. 118, June 12, 1985). However, such an ethylene-vinyl acetate copolymer graft modified with an unsaturated organosilane does not have satisfactory adhesion to metals or plastics, so that it cannot be used for the manufacture of laminates such as glass/metal laminates and glass/plastic laminates.

SUMMARY OF THE INVENTION

An object of the present invention is to provide a silane-modified ethylene copolymer which is excellent in not only adhesion to metals, glass, polar high-molecular weight materials, or polyolefins but also maintenance of water-resistant adhesion to glass.

Another object of the present invention is to provide a process for producing the silane-modified ethylene copolymer.

A further object of the present invention is to provide an adhesive comprising the above-described silane-modified ethylene copolymer.

That is, in one aspect, the present invention relates to a silane-modified ethylene copolymer, prepared by graft copolymerizing from 0.1 to 10 parts by weight of a trialkoxyvinyl silane to 100 parts by weight of an ethylene/(meth)acrylic acid ester/maleic anhydride copolymer in the presence of a peroxide catalyst.

In another aspect, the present invention relates to a process for producing the silane-modified ethylene copolymer.

In still another aspect, the present invention relates to an adhesive comprising the above-described silane-modified ethylene copolymer.

DETAILED DESCRIPTION OF THE INVENTION

The ethylene/(meth)acrylic acid ester/maleic anhydride copolymer which can be used in the present invention preferably contains from 0.3 to 12 mol % of a (meth)acrylic acid ester unit and from 0.2 to 5 mol % of a maleic anhydride unit. This copolymer can be prepared by any known radical polymerization methods.

As the copolymer, those having a number average molecular weight of from 9,000 to 27,000 are advantageously used. The number average molecular weight can be obtained by gel permeation chromatography (GPC) while referring to the method as described in *Kobunshi Sokuteiho* (Measurement of Polymers), "Kozo to Bussei" (Structure and Physical Properties), Part I, pp. 76-89 (1973), edited by The Society of Polymer Science, Japan and published by Baifukan Co., Ltd. For example, a measurement is first made with ortho-dichlorobenzene which is used as a solvent at a column oven temperature of 145° C., and the measured value is converted to the number average molecular weight on the basis of a calibration curve for average molecular weight chain length and GPC counts prepared with monodisperse polystyrene. The copolymer preferably has a melt flow index (MI) of from 1 to 200 g/10 minutes.

Suitable examples of the trialkoxyvinyl silane which can be used in the present invention include trimethoxyvinyl silane and triethoxyvinyl silane, and they can be used either alone or in admixture.

An amount of the trialkoxyvinyl silane which is grafted to the ethylene/(meth)acrylic acid ester/maleic anhydride copolymer is within the range of from 0.1 to 10 parts by weight and preferably from 0.5 to 5 parts by weight based on 100 parts by weight of the copolymer. If less than 0.1 part by weight of the trialkoxyvinyl silane is grafted to the copolymer, the resulting graft copolymer cannot retain its initial adhesion strength for a prolonged period of time in an atmosphere where water is present. On the other hand, if more than 10 parts by weight of the trialkoxyvinyl silane is used, side reactions occur extensively in addition to the intended graft copolymerization, and molded articles from the resulting graft copolymer likely contain a large quantity of acnes, whereby it becomes practically difficult to use them in the film-like state.

Examples of the peroxide which can be used as the catalyst in the present invention include dicumyl peroxide, di-t-butyl peroxide, 2,5-di(peroxybenzoate)hexyne-3,1,3-bis(t-butylperoxyisopropyl)benzene, peroxylauroyl, and 2,5-dimethyl-2,5-di(t-butylperoxy)hexane. The choice of the peroxide catalyst should be made on the basis of the characteristics of the ethylene/(meth)acrylic acid ester/maleic anhydride copolymer and the modification employed.

The peroxide catalyst is preferably used in an amount of from 0.05 to 0.3 part by weight based on 100 parts by weight of the ethylene/(meth)acrylic acid ester/maleic anhydride copolymer.

The silane-modified ethylene copolymer according to the present invention can preferably be produced by melt kneading the necessary ingredients in a kneading apparatus that is commonly employed in the manufacture of olefinic polymer compositions, such as a mixing roll, a kneader, a Banbury mixer, or an extruder, at a temperature of at least 20° C. higher than the melting point of the starting copolymer. A homogeneous composition can be obtained by previously dry blending the necessary ingredients with a mixing apparatus such as a Henschel mixer, a ribbon blender, or a tumbler before the melt kneading.

The silane-modified ethylene copolymer of the present invention can also be produced in accordance with any other known modification methods such as a solution modification method as described, for example, in Japanese Patent Publication No. 15422/69 or a slurry modification method as described, for example, in Japanese Patent Publication No. 18144/68.

The number average molecular weight of the thus produced silane-modified ethylene copolymer varies with several factors such as the molecular weight of the starting ethylene/(meth)acrylic acid ester/maleic anhydride copolymer or the production condition employed, but it usually ranges from about 12,000 to 36,000. The silane-modified ethylene copolymer generally has a melt flow index (MI) within the range of from 0.1 to 30 g/10 minutes.

The silane-modified ethylene copolymer of the present invention is useful as an adhesive because it exhibits excellent adhesion to various substances. That is, laminates, coated articles, or various other composites which are excellent in not only adhesion to metals, glass, polyolefins, or polar high-molecular weight materials but also maintenance of water-resistant adhesion to glass can be fabricated with the silane-modified ethylene copolymer of the present invention by employing any known processing techniques.

The silane-modified ethylene copolymer, if used as an adhesive, can be processed into a film form which is then held between adherends and heated to a temperature of not lower than the softening point of the resin while applying a pressure. In this case, the film processed from the copolymer preferably has a thickness of from 1 to 100 μm.

Also, the silane-modified ethylene copolymer of the present invention can be used in a solution state upon dissolution in a solvent. As the solvent, trichloroethylene is preferably used, and the concentration of the copolymer in the solution is preferably from 1 to 20% by weight.

As the method of use of the adhesive of the present invention, for example, when the manufacture of laminates or coated articles is concerned, there can be applied extrusion coating, dry lamination, thermocompression, powder coating, and combinations of these techniques, and the choice of a suitable method should be made in consideration of the use of such laminates or coated articles.

The following examples are provided for the purpose of further illustrating the present invention but are in no sense to be taken as limiting.

In the examples, various properties were measured by the following methods:

(a) MI (melt flow index):
Measured in accordance with JIS K 6760 (190° C. under a load of 2.16 kg).

(b) Adhesion strength:
(i) Adhesion to glass:
A film (50 μm in thickness) of a silane-modified ethylene copolymer that had been extruded from an extruder (20 mm in diameter) through a T die (200 mm in width) at 200° C. was superposed on a glass slide for use with a microscope (1 mm$^T$×76 mm$^L$×26 mm$^W$; a product of Matsunami Glass Industry, Ltd.), and an aluminum foil having a thickness of 40 μm (a product of Sumikei Aluminum Foil Co., Ltd.) was further superposed on the copolymer film. Thereafter, the individual layers were heat-sealed at a pressure of 1 kg/cm$^2$G for 5 seconds using a heat sealer to prepare a laminate sample. The heat sealing bar in contact with the glass slide was held at ambient temperature while the heat sealing bar in contact with the aluminum foil was held at 220° C.

A slit having a width of 1 cm was provided through the aluminum foil into the underlying silane-modified ethylene copolymer film with a knife. The laminate sample was immersed in distilled water at 80° C. for a predetermined period of time, and the recovered sample was set on a tensile tester. Measurement of adhesion strength was conducted by peeling the aluminum foil at an angle of 180° and at a speed of 100 mm/min.

(ii) Adhesion to aluminum:
A film (50 μm in thickness) of a silane-modified ethylene copolymer that had been extruded from an extruder (20 mm in diameter) through a T die (200 mm in width) at 200° C. was held between two aluminum foils each having a thickness of 40 μm (a product of Sumikei Aluminum Foil Co., Ltd.). The individual layers were heat-sealed at a pressure of 3 kg/cm$^2$G for 0.3 second to prepare a laminate sample.

The laminate sample was cut into a long strip state of 1 cm in width using a cutter and then set on a tensile tester. Measurement of adhesion strength was conducted by peeling the aluminum foil at an angle of 180° and at a speed of 100 mm/min.

(iii) Adhesion of polyamide:
A film (50 μm in thickness) of a silane-modified ethylene copolymer that had been extruded from an extruder (20 mm in diameter) through a T die (200 mm in width) at 200° C. was held between a 100 μm-thick polyamide film (Rayfan ® 1401, a product of Toray Gosei Film Co., Ltd.) and a 40 μm-thick aluminum foil (a product of Sumikei Aluminum Foil Co., Ltd.). The individual layers were heat-sealed at a pressure of 3 kg/cm$^2$G for 3 seconds at 190° C. using a heat sealer to prepare a laminate sample. In this sample, the polyamide film was disposed with its corona-treated surface placed in contact with the film of the silane-modified ethylene copolymer.

The laminate sample was cut into a long strip state of 1 cm in width using a cutter and then set on a tensile tester. Measurement of adhesion strength was conducted by peeling the polyamide film at an angle of 180° and at a speed of 100 mm/min.

(iv) Adhesion to polypropylene:

A film (50 μm in thickness) of a silane-modified ethylene copolymer that had been extruded from an extruder (20 mm in diameter) through a T die (200 mm in width) at 200° C. was held between a 50 μm-thick polypropylene film (Sumitomo Noblen® FL 8016, a product of Sumitomo Chemical Co., Ltd.) that had been extruded from an extruder (20 mm in diameter) through a T die (200 mm in width) at 230° C. and a 40 μm-thick aluminum foil (a product of Sumikei Aluminum Foil Co., Ltd.). The individual layers were heat-sealed at a pressure of 3 kg/cm²G for 3 seconds at 140° C. using a heat sealer to prepare a laminate sample.

The laminate sample was cut into a long strip state of 1 cm in width using a cutter and then set on a tensile tester. Measurement of adhesion strength was conducted by peeling the polypropylene film at an angle of 180° at a speed of 100 mm/min.

EXAMPLE 1

One hundred parts by weight of an ethylene/ethyl acrylate/maleic anhydride copolymer (MI: 83 g/10 min., ethyl acrylate content: 5.3 mol %, maleic anhydride content: 0.9 mol %) was dry blended with 0.15 part by weight of dicumyl peroxide and 2.0 parts by weight of triethoxyvinyl silane for 3 minutes in a Henschel mixer.

The resulting blend was subjected to graft copolymerization by extruding from a uniaxial extruder (30 mm in diameter) at a resin temperature of 168° C. The extrusion output was about 2 kg per hour, and the residence time of the copolymer in the extruder was about 2.5 minutes.

The resulting graft copolymer had an MI of 11 g/10 min. The adhesion of this graft copolymer to a variety of substrates was evaluated by the methods and under the conditions as described above. The results are shown in Table 1.

EXAMPLES 2 TO 5 AND COMPARATIVE EXAMPLES 1 TO 3

Graft copolymers were prepared in the same manner as in Example 1 with the types and compositions of the ethylene copolymer, the trialkoxyvinyl silane, and the peroxide catalyst being changed to those indicated in Table 1. The adhesion of each of the graft copolymers to a variety of substrates was evaluated by the same methods and under the conditions as described above. The results are also shown in Table 1.

TABLE 1

| | Ethylene copolymer | | Trialkoxyvinyl silane | | Peroxide | | Resin temperature at modification (°C.) | Adhesion strength to glass Time of immersion in hot water at 80° C. (hr) | | |
|---|---|---|---|---|---|---|---|---|---|---|
| | Type | Amount (wt. part) | Type | Amount (wt. part) | Type | Amount (wt. part) | | 0 (kg/cm) | 1 (kg/cm) | 3 (kg/cm) |
| Example 1 | A[1)] | 100 | D[4)] | 2.0 | F[6)] | 0.15 | 168 | 0.93 | — | 1.01 |
| Example 2 | A | 100 | D | 3.0 | F | 0.2 | 171 | 1.10 | — | 1.02 |
| Example 3 | A | 100 | D | 3.0 | G[7)] | 0.3 | 170 | 0.90 | — | 0.95 |
| Example 4 | A | 100 | E[5)] | 2.0 | F | 0.2 | 169 | 1.03 | — | 1.27 |
| Example 5 | B[2)] | 100 | D | 2.0 | F | 0.15 | 167 | 0.87 | — | 0.94 |
| Comp. Example 1 | A | 100 | — | — | — | — | — | 0.82 | 0.90 | 0 |
| Comp. Example 2 | A | 100 | D | 2.0 | — | — | 168 | 0.93 | 0.76 | 0 |
| Comp. Example 3 | C[3)] | 100 | D | 2.0 | F | 0.2 | 172 | 1.05 | — | 1.16 |

| | Adhesion strength to glass Time of immersion in hot water at 80° C. (hr) | | | Adhesion strength | | |
|---|---|---|---|---|---|---|
| | 6 (kg/cm) | 12 (kg/cm) | 24 (kg/cm) | Aluminum (kg/cm) | Polyamide (kg/cm) | Polypropylene (kg/cm) |
| Example 1 | 0.96 | 0.90 | 0.87 | 0.87 | 0.71 | 0.47 |
| Example 2 | 1.13 | 1.10 | 0.98 | 0.90 | 0.63 | 0.50 |
| Example 3 | 0.89 | 0.78 | 0.81 | 0.89 | 0.75 | 0.45 |
| Example 4 | 0.98 | 1.03 | 0.95 | 0.96 | 0.73 | 0.51 |
| Example 5 | 0.91 | 0.85 | 0.86 | 0.85 | 0.66 | 0.44 |
| Comp. Example 1 | — | — | — | 0.88 | 0.67 | 0.53 |
| Comp. Example 2 | — | — | — | 0.83 | 0.72 | 0.46 |
| Comp. Example 3 | 0.99 | 1.10 | 1.07 | 0.14 | 0.10 | 0.08 |

[1)]Ethylene/ethyl acrylate/maleic anhydride copolymer (MI: 83 g/10 min., ethyl acrylate content: 5.3 mol %, maleic anhydride content: 0.9 mol %)
[2)]Ethylene/ethyl acrylate/maleic anhydride copolymer (MI: 190 g/10 min., ethyl acrylate content: 2.1 mol %, maleic anhydride content: 0.9 mol %)
[3)]Ethylene/vinyl acetate copolymer (MI: 21 g/10 min., vinyl acetate content: 6.7 mol %)
[4)]Triethoxyvinyl silane (a reagent grade produced by Tokyo Kasei K.K.)
[5)]Trimethoxyvinyl silane (a reagent grade produced by Tokyo Kasei K.K.)
[6)]Dicumyl peroxide (a product of Nippon Oils & Fats Co., Ltd.)
[7)]α,α'-Bis(t-butylperoxy-m-isopropyl)benzene (a product of Nippon Oils & Fats Co., Ltd.)

As is understood from the foregoing, the present invention provides a silane-modified ethylene copolymer that is superior to the prior art products in terms of adhesion to metals, glass, polar high-molecular weight materials, or polyolefins. This copolymer has an additional advantage of exhibiting excellent maintenance of water-resistant adhesion to glass. The present invention also provides a process for producing a silane-modified ethylene copolymer and an adhesive comprising the same.

While the invention has been described in detail and with reference to specific embodiments thereof, it will be apparent to one skilled in the art that various changes and modifications can be made therein without departing from the spirit and scope thereof.

What is claimed is:

1. An adhesive for glass/polyamide laminates, prepared by graft copolymerizing from 0.1 to 10 parts by weight of trimethoxyvinyl silane and/or triethoxyvinyl silane to 100 parts by weight of an ethylene/(meth)acrylic acid ester/maleic anhydride copolymer having a (meth)acrylic acid ester unit content of from 0.3 to 12 mol % and a maleic anhydride unit content of from 0.2 to 5 mol % and having a melt flow index of from 1 to 200 g/10 minutes in the presence of a peroxide catalyst.

* * * * *